(12) United States Patent
Abusleme et al.

(10) Patent No.: US 7,320,818 B2
(45) Date of Patent: Jan. 22, 2008

(54) MULTILAYERS OF POLYAMIDES AND FLUORINATED COPOLYMERS

(75) Inventors: Julio A. Abusleme, Varese (IT); Claudia Manzoni, Bologna (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/086,845

(22) Filed: Mar. 4, 2002

(65) Prior Publication Data

US 2003/0068499 A1    Apr. 10, 2003

(30) Foreign Application Priority Data

Mar. 13, 2001 (IT) .................. MI2001 A 0525
May 31, 2001 (IT) .................. MI2001 A 1152

(51) Int. Cl.
B32B 27/02 (2006.01)
B32B 27/08 (2006.01)
B32B 27/18 (2006.01)
B32B 27/30 (2006.01)
B32B 27/34 (2006.01)

(52) U.S. Cl. .................. 428/36.91; 428/373; 428/378; 428/421; 428/474.4

(58) Field of Classification Search .............. 428/421, 428/36.91, 474.4, 475.8, 476.3, 373, 375, 428/378

See application file for complete search history.

(56) References Cited

U.S. PATENT DOCUMENTS

| 4,543,378 | A | | 9/1985 | Suhara et al. ............... 524/100 |
| 5,869,157 | A | * | 2/1999 | Stoeppelmann .......... 428/36.91 |
| 5,958,532 | A | * | 9/1999 | Krause et al. ............. 428/36.3 |
| 6,509,073 | B1 | * | 1/2003 | Arcella et al. ........... 428/36.91 |

FOREIGN PATENT DOCUMENTS

| EP | 0 726 293 A1 | 8/1996 |
| EP | 0 866 079 A2 | 9/1998 |
| EP | 1 038 914 A1 | 9/2000 |
| EP | 1 101 994 A2 | 5/2001 |
| EP | 1 188 555 A2 | 3/2002 |

OTHER PUBLICATIONS

Patent Abstracts of Japan; Abstract of JP 03 134371; Jun. 7, 1991.

* cited by examiner

*Primary Examiner*—Ramsey Zacharia
(74) *Attorney, Agent, or Firm*—Arent Fox LLP

(57) ABSTRACT

Multilayer manufactured articles comprising at least one layer based on thermoprocessable copolymers of ethylene with chlorotrifluoroethylene and/or tetrafluroethylene and with acrylic monomers, and one layer based on polyamides.

17 Claims, No Drawings

MULTILAYERS OF POLYAMIDES AND FLUORINATED COPOLYMERS

The present invention relates to multilayers (laminates) comprising at least one layer formed by thermoprocessable copolymers of ethylene (E) with chlorotrifluoroethylene (CTFE) and/or tetrafluoroethylene (TFE) and at least one acrylic monomer, and a polyamide layer, characterized in having a very high adhesion among the layers, and to the process for the preparation thereof. The adhesion between the layers is so high that at the delamination tests, the specimen breaks without layer separation, and in any case the adhesion force among the layers is higher than 10 N/mm.

Said multilayers show, besides a high adhesion among the layers, good mechanical properties and high chemical resistance.

It is well known that polyamides, for their outstanding mechanical properties are used in the preparation of fuel lines employed in the car industry. However they show a poor chemical resistance and permeability to gasolines containing polar substances, for example alcohols. Said permeability causes the release in the environment of dangerous substances which are subjected to restriction by the laws of most countries.

The need was therefore felt to have available fuel lines or manufactured articles having a low permeability to gasolines containing polar substances.

It is also known that thermoprocessable fluorinated copolymers of ethylene with chlorotrifluoroethylene and/or tetrafluoroethylene, for example Halar® sold by Ausimont USA Inc., compared with polyamides, have a higher chemical resistance to gasolines containing polar substances and to particularly aggressive lubricant oils used in the car industry. Said fluorinated copolymers have however a high cost which limits the use thereof.

To make economically possible the use of the above fluorinated copolymers it has been tried to prepare manufactured articles as fuel lines wherein said fluorinated copolymers are coupled with polyamides to form multilayer. However the adhesion between said fluorinated polymers and polyamides is very poor. Tests carried out by the Applicant have shown that by coupling fluorinated copolymers E/CTFE with polyamides, for example by applying a pressure on the multilayers maintained at the softening temperature or by co-extrusion, adhesion is very poor. Therefore there was a need to have available multilayer articles characterized by having combined the excellent mechanical properties of polyamides with the good chemical resistance properties of fluorinated copolymers E/CTFE and/or TFE, showing an adhesion among the layers higher than 10 N/mm.

The Applicant has surprisingly and unexpectedly found that it is possible to obtain said multilayers, by using the layers as defined below.

An object of the present invention is a multilayer comprising at least:
A) a layer based on thermoprocessable copolymers of ethylene with chlorotrifluoroethylene, and/or tetrafluoroethylene, and with acrylic monomers of formula:

$$CH_2=CH-CO-O-R_2 \quad (a)$$

wherein $R_2$ is a hydrogenated radical from 1 to 20 carbon atoms, of alkyl, linear or branched type, cycloalkyl type, or H; $R_2$ optionally contains Cl, O, N and/or one or more functional groups selected from —OH, —COOH, epoxide, ester or ether; wherein the (a) monomer amount is in the range 0.01-15% by moles with respect to the sum of the monomers of ethylene and CTFE and/or TFE; and B) a layer based on polyamides having an amount of —$NH_2$ end groups between 40 and 300 µeq/g, preferably between 45 and 150 µeq/g.

Optionally on the top of layer A), it can be placed a layer A1) based on copolymers of ethylene with chlorotrifluoroethylene, and/or tetrafluoroethylene, not containing the acrylic monomer (a), or a layer B). On the top of layer B), it can be placed a layer B1) based on polyamide having an amount of —$NH_2$ end groups lower than 40 µeq/g, or a layer A).

When layers A1) and B1) are present, layers A) and/or B) act as tie-layers and therefore their thickness can be reduced.

Preferably the fluorinated comonomer of A) and of A1) is CTFE.

The thermaprocessable copolymers of layer A) are formed by:
- from 10 to 70% by moles, preferably from 35 to 55% of ethylene;
- from 30 to 90% by moles, preferably from 45 to 65%, of a fluorinated monomer selected from tetrafluoroethylene, chlorotrifluoroethylene, or mixtures thereof;
- from 0.05% to 15% by moles of the acrylic monomer (a) referred to the sum of the previous monomers.

As acrylic monomer of formula (a), n-butylacrylate (n-BuA) is preferred.

The layer A) can also be formed by a blend of the copolymers of layer A) and the copolymers of layer A1), provided that the blend contains an amount of acrylic monomer (a) in the range 0.01-15% by moles with respect to the total sum of the monomers of ethylene and of CTFE and/or TFE of the blend.

When layer A) is the top layer, the comonomer (a) is preferably lower than 1% by moles with respect to the sum of the monomers of ethylene and chlorotrifluoroethylene and/or tetrafluoroethylene.

The —$NH_2$ end groups rich polyamides, higher than 40 µeq/g, can be prepared according to known methods, for example according to U.S. Pat. No. 4,543,378, wherein a chain transfer agent is used in the polymerization reaction. As example of chain transfer, m- or p-xylylendiamine, hexamethylendiamine or dodecamethylendiamine can be cited.

The polyamide of layer B) having an amount of —$NH_2$ end groups higher than 40 µeq/g can also be obtained by mixing polyamides having different contents of —$NH_2$ end groups so that the final mixture contains an amount of —$NH_2$ end groups higher than 40 µeq/g.

The polyamides of layer B), can be a (co)polyamide for example polyamide 6 (PA 6), polyamide 66 (PA 66), polyamide 11 (PA 11), polyamide 12 (PA 12).

The polyamides of layer B) can optionally contain one or more diamines.

The Applicant has also found that the multilayer of the invention endowed with excellent adhesion can be obtained by using as layer B) a blend between a polyamide having an amount of —$NH_2$ end groups lower than 40 µeq/g with 0.01-5% by weight, preferably 0.1-2% by weight, of one or more diamines. The Applicant has found that by using polyamides having a number of —$NH_2$ end groups lower than 40 µeq/g, and not containing one or more diamines, the adhesion between the layers is insignificant (peeling force <<1 N/mm).

The polyamides having —$NH_2$ end groups lower than 40 µeq/g, can be (co)polyamides, such as for example, polyamide 6, polyamide 66, polyamide 11, polyamide 12.

Non limitative examples of diamines are protected amines, such as for example hexamethylendiaminecarbamate and N,N'-dicinnamylidene-1,6 hexandiamine, $C_4$-$C_{20}$ aliphatic diamines, such as for example dodecyldiamine and decyldiamine, aromatic diamines, such as for example paraxylilendiamine. Aliphatic and aromatic protected diamines are preferred.

The single layers of the invention can optionally contain additives such as fillers (for example polytetrafluoroethylene (PTFE), silicates, graphite, carbon black), lubricants, pigments, fire retardants, plasticizers and thermal and UV stabilizers.

The multilayer of the present invention can be obtained by co-extrusion. Alternatively, the single layers are coupled by heating at the softening temperature of the copolymers forming the layers. The preferred method is the co-extrusion, by which fuel lines are, for example, obtained.

The fuel lines of the invention have high chemical resistance and low permeability to fuels that may also contain polar compounds. When the fluid flowing in the fuel line is a liquid it is required that the polymer layer in contact with the liquid must be able to dissipate the generated static electricity. To this purpose, as it is well known, the internal layer is filled with a conductive material, such as for example graphite and/or carbon black in the form of powders, fibers, particles. Then the so filled layers become conductive. The amount of conductive material in the polymer is generally lower than 20% by weight. This amount can vary depending on the specific requirements of static electricity dissipation. Generally it is required that the conductive layer has a surface resistivity in the range $10^1$-$10^6$ Ohm. In the case of a bilayer A/B, the conductive material can be present in A) or in B), provided that it is present in the layer in contact with the liquid. Optionally the conductive material can be present in both layers A) and B). In multilayers, the layer in contact with the liquid must be conductive, optionally one or more of the other layers can be conductive.

The fuel lines obtainable according to the present invention show for example the following multilayer structures, in sequence from the outer layer to the inner layer.

B1 (optional)/B/A/A1 (optional)

B1 (optional)/B/A/A1 conductive

B1 (optional)/B/A/B conductive

B1 (optional)/B/A/B/B1 conductive

B1 (optional)/B/A conductive

B1 (optional)/B/A/A conductive

The polyamide of layer B is preferably of the same type of layer B1.

Generally the fuel lines show the following characteristics:

total thickness 0.4-2 mm;

thickness of the inner layer(s) 0.1-0.2 mm;

layer A and/or B, when acting as tie-layers have a thickness of 0.05-0.1 mm;

layer A and/or B, when they are outer layer, have a thickness of 0.15-0.25 mm;

layer A1 and/or B1, when they are outer layer, have a thickness of 0.15-0.25 mm.

The multilayers of the invention are particularly suitable for the preparation of fuel lines.

Another use of the present invention is that to allow the preparation of sheath-core fibers wherein the core is layer B) of the invention and is a polyamide 6,6 added with diamines or a polyamide 6,6 having a number of —$NH_2$ groups between 40 and 300 µeq/g; and the sheath, the outer layer covering the polyamide core, is layer A) as above defined. Preferably layer A) contains an amount of comonomer (a) lower than 1% by moles.

Said sheath-core fibers can be used in the preparation of textiles when a high repellance to water combined with high mechanical properties and resistance to abrasion are required.

Some illustrative examples follow, which are not limitative of the present invention.

The following characterizations were carried out on the polymers used in the examples:

Melt Flow Index (M.I.)

the M.I. of the fluorinated polymers is measured according to the method ASTM 3275-89, at 275° C. and with a load of 2, 16 kg;

Second melting temperature ($T_{mII}$)

the $T_{mII}$ of the fluorinated polymers is determined by differential scanning calorimetry (DSC);

—$NH_2$ end groups the number of the —$NH_2$ end groups of polyamides is determined by preparing a solution at 2% of polyamide in m-cresol and subsequent titration with perchloric acid.

EXAMPLES

Example 1

Layer A)

Ethylene (E)/Chlorotrifluoroethylene(CTFE)/n-Butylacrylate(n-BuA) 48.6/51/0.4% by Moles The copolymer has been prepared according to known methods described for example in EP 866 079 and is characterized by:

M.I. 16.5 g/10'

$T_{mII}$ 236° C.

Some plaques of the polymer having a thickness of 1.5 mm have been obtained by compression moulding.

Layer B)

Polyamide 12 (PA 12) Having —$NH_2$ End Groups Equal to 110 µeq/g

Some plaques of the polyamide having a thickness of 1.5 mm have been obtained by compression moulding.

Preparation of the A/B Laminate

The plaques of the single layers A and B, previously obtained, have been overlapped and kept under pressure at a temperature of 270° C. for 10 minutes.

By applying a mechanical force one tries to separate layer A from layer B.

One cannot measure the adhesion force between layer A and layer B. By increasing the force to separate the layers, one breaks the manufactured article without obtaining delamination. This shows that the laminate according to the invention shows a high adhesion.

Example 2 (Comparative)

Layer A)
The same copolymer of Example 1, E/CTFE/n-BuA 48.6/51/-0.4 moles % is used.

Layer B1)

PA 12 Having —$NH_2$ End Groups Equal to 22 µeq/g
Some plaques of the polyamide having a thickness of 1.5 mm have been obtained by compression moulding.

Preparation of the A/B1 Laminate

The plaques of the single layers A and B1, previously obtained, have been overlapped and kept under pressure at a temperature of 270° C. for 10 minutes.

The A/B1 laminate does not show any adhesion between the layers.

Example 3

Layer A)
The same copolymer of Example 1, E/CTFE/n-BuA 48.6/51/0.4% by moles is used.

Layer B)

PA 12 Having —$NH_2$ End Groups Equal to 51 µeq/g
The polyamide has been obtained by mechanically mixing 330 g of PA 12 of Example 1 (—$NH_2$=110 µeq/g) with 670 g of PA 12 of Example 2 (—$NH_2$=22 µeq/g). Then the blend has been pelletized in a single screw Brabender extruder in Hastelloy C-276 having a diameter of 18 mm and a length equivalent to 25 times the diameter, with a melt temperature of 225° C. Plaques having a thickness of 1.5 mm have been prepared from the granules by compression moulding.

Preparation of the A/B Laminate

The plaques of the single layers A and B, previously obtained, have been overlapped and kept under pressure at a temperature of 270° C. for 10 minutes.

By applying a mechanical force one tries to separate layer A from layer B.

One cannot measure the adhesion force between layer A and layer B. This shows that the laminate of the invention shows a high adhesion among the single layers.

Example 4 (Comparative)

Layer A1)

Copolymer E/CTFE 49/51% by Moles
The copolymer, lacking of the acrylic monomer, has been prepared with the same methods used for the copolymer of layer A) of Example 1 and is characterized by:
M.I. 15 g/10'
$T_{mII}$ 240° C.
Some plaques of the polymer having a thickness of 1.5 mm have been obtained by compression moulding.

Layer B1)
The same polyamide of Example 2, PA 12 having —$NH_2$ end groups equal to 22 µeq/g is used.

Preparation of the A1/B1 Laminate

The plaques of the single layers A1 and B1, previously obtained, have been overlapped and kept under pressure at a temperature of 270° C. for 10 minutes.

The A1/B1 laminate does not show any adhesion between its layers.

Example 5 (Comparative)

Layer A1)
The same copolymer of Example 4, E/CTFE 49/51% by moles is used.

Layer B)
The same polyamide of Example 1, PA 12 having —$NH_2$ end groups equal to 110 µeq/g is used.

Preparation of the A1/B Laminate

The plaques of the single layers A1 and B, previously obtained, have been overlapped and kept under pressure at a temperature of 270° C. for 10 minutes.

The A1/B laminate does not show any adhesion between its layers.

Example 6

Layer A)

E/CTFE/n-BuA 40/55/5% by Moles
The copolymer has been prepared by the methods used for the preparation of the copolymer of Example 1 and is characterized by:
M.I. 15 g/10'
$T_{mII}$ 180°-200° C.
Some plaques of the polymer having a thickness of 1.5 mm have been obtained by compression moulding.

Layer B)
The same polyamide of Example 1, PA 12 with —$NH_2$ end groups equal to 110 µeq/g is used.

Preparation of the A/B Laminate

The plaques of the single layers A and B, previously obtained, have been overlapped and kept under pressure at a temperature of 270° C. for 5 minutes.

By applying a mechanical force one tries to separate layer A from layer B.

One cannot measure the adhesion force between layer A and layer B. By increasing the force to separate the layers, one breaks the manufactured article without obtaining the delamination.

Example 7 (Comparative)

Layer A)
The copolymer of Example 6, E/CTFE/n-BuA 40/55/5% by moles is used.

Layer B1)
The same polyamide of Example 2 PA 12 with —$NH_2$ end groups equal to 22 µeq/g is used.

Preparation of the A/B1 Laminate

The plaques of the single layers A and B1, previously obtained, have been overlapped and kept under pressure at a temperature of 270° C. for 10 minutes.

The A/B1 laminate does not show any adhesion between its layers.

Example 8

Layer A)
The copolymer of Example 1, E/CTFE/n-BuA 48.6/51/0.4% by moles is used.

Layer B)

Polyamide PA 12 with —$NH_2$ End Groups Equal to 22 μeq/g Blended with 1% by Weight of Diamine One kilogram of polyamide (PA 12) in granules, having —$NH_2$ end groups equal to 22 μeq/g, has been blended with 1% by weight of hexamethylendiamine monocarbamate. Then it has been pelletized in a single screw Brabender extruder in Hastelloy C-276 having a diameter of 18 mm and a length equivalent to 25 times the diameter with a melt temperature of 225° C. Plaques having a thickness of 1.5 mm have been obtained from the granules by compression moulding.

Preparation of the A/B Laminate

The plaques of the single layers A and B, previously obtained, have been overlapped and kept under pressure at a temperature of 270° C. for 10 minutes.

By applying a mechanical force one tries to separate layer A from layer B.

One cannot measure the adhesion force between layer A and layer B. By increasing the force to separate the layers, one breaks the laminate without obtaining the delamination.

Example 9

Layer A)

Blend of the Copolymer E/CTFE/(49/51% by Moles) with the Copolymer E/CTFE/n-BuA (40/55/5% by Moles) with a Ratio by Weight 97/3

The blend has been prepared by mixing 30 g of the copolymer of layer A of Example 6 with 970 g of the copolymer of layer A1 of Example 4. Then the blend has been pelletized in a single screw Brabender extruder in Hastelloy C-276 having a diameter of 18 mm and a length equivalent to 25 times the diameter with a melt temperature of 270° C. Plaques having a thickness of 1.5 mm have been obtained from the granules by compression moulding.

Layer B)

Polyamide PA 12 Having —$NH_2$ End Groups Equal to 22 μeq/g Blended with 0.4% by Weight of Diamine One kilogram polyamide (PA 12) in granules, having —$NH_2$ end groups equal to 22 μeq/g, has been blended with 0.4% by weight of hexamethylendiamine monocarbamate. Then it has been pelletized in a single screw Brabender extruder in Hastelloy C-276 having a diameter of 18 mm and a length equivalent to 25 times the diameter with a melt temperature of 225° C. Plaques having a thickness of 1.5 mm have been obtained from the granules by compression moulding.

Preparation of the A/B Laminate

The plaques of the single layers A and B, previously obtained, have been overlapped and kept under pressure at a temperature of 270° C. for 10 minutes.

By applying a mechanical force one tries to separate layer A from layer B.

One cannot measure the adhesion force. Increasing the force to separate the layers, one breaks the manufactured article, without obtaining delamination.

Example 10 (Comparative)

Layer A1)
The polymer of Example 4, E/CTFE 49/51% by moles has been used.

Layer B)
The polyamide of Example 8, PA 12 with —$NH_2$ end groups equal to 22 μeq/g added with 1% by weight of diamine has been used.

Preparation of the A1/B Laminate

The plaques of the single layers A1 and B, previously obtained, have been overlapped and kept under pressure at a temperature of 270° C. for 10 minutes.

The A1/B laminate does not show any adhesion between its components.

Example 11

Layer A)
The polymer of Example 1 (E/CTFE/n-BuA 48.6/51/0.4% by moles) is used to prepare a plaque by compression moulding.

Layer B)
From the polyamide of Example 1 (PA 12 having —$NH_2$ end groups equal to 110 μeq/g) a plaque having a thickness of 0.3 mm (tie-layer) has been obtained by compression moulding.

Layer B1)
The same polyamide of Example 2 (PA 12 having —$NH_2$ end groups equal to 22 μeq/g) is used to prepare a plaque.

Preparation of the A/B/B1 Multilayer

The plaques of the single layers A, B and B1, previously obtained, have been overlapped in the order A/B/B1 and kept under pressure at a temperature of 270° C. for 10 minutes.

By applying a mechanical force one tries to separate layer A from layer B1 of the multilayer A/B/B1.

One cannot measure the delamination force. This shows that the multilayer of the invention shows a high adhesion among the layers.

Example 12

Layer A1)
The polymer of Example 4 (E/CTFE 49/51% by moles) is used to prepare a plaque.

Layer A)
From the copolymer of Example 6 (E/CTFE /n-BuA 40/55/5% by moles) a plaque having a thickness of 0.3 mm (tie-layer) has been obtained by compression moulding.

Layer B)
The polyamide of Example 9 (PA 12 having —$NH_2$ end groups equal to 22 μeq/g added with 0.4% by weight of diamine) has been used to prepare a plaque.

Preparation of the A1/A/B Multilayer

The plaques of the single layers A1, A and B, previously obtained, have been overlapped in the order A1/A/B, and kept under pressure at a temperature of 270° C. for 10 minutes.

By applying a mechanical force one tries to separate layer A1 from layer B of the A1/A/B multilayer.

One cannot measure the delamination force. This shows that the multilayer of the invention shows a high adhesion among the layers.

The invention claimed is:

1. Multilayer manufactured articles consisting essentially of:
   A) a layer consisting of thermoprocessable copolymers of ethylene with chlorotrifluoroethylene, and/or tetrafluoroethylene, and with acrylic monomers of formula:

$$CH_2=CH—CO—O—R_2 \qquad (a)$$

wherein $R_2$ is a hydrogenated radical from 1 to 20 carbon atoms, of alkyl, linear or branched type, cycloalkyl type, or H; $R_2$ optionally contains Cl, O, N and/or one or more functional groups selected from —OH, —COOH, epoxide, ester or ether; wherein the (a) monomer amount is in the range of 0.01-15% by moles with respect to the sum of the monomers of ethylene and of CTFE and/or TFE and optionally containing additives selected from fillers, lubricants, pigments, fire retardants, plasticizers, and thermal and UV stabilizers; and B) a layer consisting of polyamides having an amount of —$NH_2$ end groups in the range of 40-300 µeq/g and optionally containing additives selected from fillers, lubricants, pigments, fire retardants, plasticizers, and thermal and UV stabilizers;

wherein there is adhesion higher than 10 N/mm between the layers of A) and B), and wherein the adhesion is reached after coextrusion or coupling the layers at softening temperatures of the copolymers of layers A) and B).

2. Multilayer manufactured articles according to claim 1, wherein the thermoprocessable copolymers of layer A) are formed by:
   from 10 to 70% by moles of ethylene;
   from 30 to 90% by moles of a fluorinated monomer selected from tetrafluoroethylene, chlorotrifluoroethylene, or mixtures thereof;
   from 0.05% to 15% by moles of the acrylic comonomer (a) referred to the sum of the previous monomers.

3. Multilayer manufactured articles according to claim 2, wherein the thermoprocessable copolymers of layer A) are formed by 35 to 55% by moles of ethylene.

4. Multilayer manufactured articles according to claim 2, wherein the thermoprocessable copolymers of layer A) are formed by 45 to 65% by moles of a fluorinated monomer selected from tetrafluoroethylene, chlorotrifluoroethylene, or mixtures thereof.

5. Multilayer manufactured articles according to claim 2, wherein the said fluorinated monomer is chlorotrifluoroethylene (CTFE).

6. Multilayer manufactured articles according to claim 2, wherein the acrylic monomers comprise n-butylacrylate.

7. Multilayer manufactured articles according to claim 1, wherein layer A) is formed by a blend of the copolymers of layer A) and copolymers of ethylene with chlorotrifluoroethylene and/or tetrafluoroethylene without the acrylic monomer, provided that the blend contains an amount of acrylic monomer (a) in the range of 0.01% to 15% by moles with respect to the total sum of the monomers of ethylene and of CTFE and/or TFE of the blend.

8. Multilayer manufactured articles according to claim 1, wherein the polyamides of layer B) are formed by a blend of polyamides having different contents of —$NH_2$ end groups provided that the blend contains an amount of —$NH_2$ end groups higher than 40 µeq/g.

9. Multilayer manufactured articles according to claim 1, wherein on the top of layer A) a layer A1) is placed based on copolymers of ethylene with chlorotrifluoroethylene, and/or tetrafluoroethylene, not containing the acrylic monomer (a), and/or on the top of layer B), a layer B1) is placed based on polyamide having an amount of —$NH_2$ end groups lower than 40 µeq/g.

10. Multilayer manufactured articles according to claim 1, in the form of sheath-core fibers.

11. Fuel lines formed by multilayers according to claim 1, wherein at least the internal layer in contact with the liquid fuel is made conductive by incorporation of graphite and/or carbon black.

12. Multilayer manufactured articles according to claim 1, wherein the layer based on polyamides has an amount of —$NH_2$ end groups in the range of 45-150 µeq/g.

13. Multilayer manufactured articles according to claim 1, wherein the fillers of layer A) and/or the fillers of layer B) are selected from polytetrafluoroethylene (PTFE), silicates, graphite, and carbon black.

14. Multilayer manufactured articles comprising at least:
   A) a layer consisting essentially of thermoprocessable copolymers of ethylene with chlorotrifluoroethylene, and/or tetrafluoroethylene, and with acrylic monomers of formula:

$$CH_2=CH—CO—O—R_2 \qquad (a)$$

wherein $R_2$ is a hydrogenated radical from 1 to 20 carbon atoms, of alkyl, linear or branched type, cycloalkyl type, or H; $R_2$ optionally contains Cl, O, N and/or one or more functional groups selected from —OH, —COOH, epoxide, ester or ether; wherein the (a) monomer amount is in the range of 0.01-15% by moles with respect to the sum of the monomers of ethylene and of CTFE and/or TEE, blended with copolymers of ethylene with chlorotrifluoroethylene and/or tetrafluoroethylene without the acrylic monomers, provided that the blend contains an amount of acrylic monomer (a) in the range of 0.01% to 15% by moles with respect to the total sum of the monomers of ethylene and of CTFE and/or TFE of the blend; and B) a layer based on polyamides having an amount of —$NH_2$ end groups lower than 40 µeq/g, blended with 0.01-5% by weight of one or more diamines wherein there is adhesion higher than 10 N/mm between the layers of A) and B), and wherein the adhesion is reached after coextrusion or coupling the layers at softening temperatures of the copolymers of layers A) and B).

15. Multilayer manufactured articles according to claim 14, wherein the diamines are selected from the group formed by hexamethylendiaminecarbamate, N,N'-dicinnamylidene-1,6hexandiamine, dodecyldiamine and decyldiamine, paraxylylendiamine.

16. Multilayer manufactured articles according to claim 14, wherein layer B) is blended with 0.1-2% by weight of one or more diamines.

17. Multilayer manufactured articles comprising at least:
   A) a layer formed by a blend of thermoprocessable copolymers of ethylene with chlorotrifluoroethylene, and/or tetrafluoroethylene, and with acrylic monomers of formula:

$$CH_2=CH—CO—O—R_2 \qquad (a)$$

wherein $R_2$ is a hydrogenated radical from 1 to 20 carbon atoms, of alkyl, linear or branched type, cycloalkyl type, or H; $R_2$ optionally contains Cl, O, N and/or one or more functional groups selected from —OH, —COOH, epoxide, ester or ether;

wherein the (a) monomer amount is in the range of 0.01-15% by moles with respect to the sum of the monomers of ethylene and of CTFE and/or TFE, with copolymers of ethylene with chlorotrifluoroethylene and/or tetrafluoroethylene without the acrylic monomers, provided that the blend contains an amount of acrylic monomer (a) in the range of 0.01% to 15% by moles with respect to the total sum of the monomers of ethylene and of CTFE and/or TFE of the blend; and B) a layer based on a polyamide having an amount of —$NH_2$ end groups in the range 40-300 μeq/g, and wherein the polyamide containing one or more diamines.

\* \* \* \* \*